United States Patent [19]

Hanson

[11] 4,044,420
[45] Aug. 30, 1977

[54] PAN CLEANING APPARATUS

[76] Inventor: Douglas R. Hanson, 1720 - 9th Ave. South, Minneapolis, Minn. 55404

[21] Appl. No.: 590,404

[22] Filed: June 26, 1975

Related U.S. Application Data

[63] Continuation-in-part of Ser. No. 496,105, Aug. 9, 1974, Pat. No. 3,999,238.

[51] Int. Cl.² ............................................... B08B 9/08
[52] U.S. Cl. ..................................... 15/304; 15/306 B; 15/345; 15/360
[58] Field of Search ...................... 15/306 A, 345, 346, 15/359, 306 R, 306 B, 304, 360

[56] References Cited

U.S. PATENT DOCUMENTS

| | | | |
|---|---|---|---|
| 345,610 | 7/1886 | Wood | 15/345 X |
| 659,440 | 10/1900 | Farquhar | 15/345 |
| 2,137,104 | 11/1938 | Zademach | 15/306 B X |
| 2,361,909 | 11/1944 | Bernal | 15/359 X |
| 2,644,188 | 7/1953 | Pacilio | 15/306 B X |
| 2,917,768 | 12/1959 | Walberer | 15/304 |
| 2,935,034 | 5/1960 | Jacobs | 15/306 B X |
| 3,678,534 | 7/1972 | Hilbig | 15/345 |
| 3,805,316 | 4/1974 | Sheppard | 15/306 B |

Primary Examiner—Christopher K. Moore
Attorney, Agent, or Firm—Dugger, Johnson & Westman

[57] ABSTRACT

A pan cleaning apparatus for use with bun and roll pans in bakeries which will use a combined air blast and vacuum action to loosen seeds, crumbs or the like as well as other foreign material which may be lodged in a bun pan after use. The device may include brushes arranged to brush all of the corners and recesses of the pan adequately for loosening material with the air blast-vacuum hood which removes debris from the pan used as a final cleaning stage.

4 Claims, 10 Drawing Figures

PAN CLEANING APPARATUS

CROSS REFERENCE TO RELATED APPLICATION

This application is a continuation-in-part of my co-pending application Ser. No. 496,105, filed Aug. 9, 1974 for Pan Cleaning Apparatus, now U.S. Pat. No. 3,999,238.

BACKGROUND OF THE INVENTION

1. Field of the Invention

The present invention relates to cleaning apparatus for pans or the like.

2. Prior Art

In normal apparatus for cleaning pans such as bakery bun pans, which are relatively shallow, but which have a number of irregularities to define bun receptacles, the general way of cleaning has been to use only a cylindrical rotating brush to scrub the pans to loosen seeds, crusts, and other pieces of material that should be removed before new buns are placed into the pan. Because of the many corners and recesses in the pans a thorough cleaning job is difficult to achieve with a cylindrical rotating brush particularly in the corners between a bottom wall and an upright wall.

SUMMARY OF THE INVENTION

The present invention relates to a pan cleaning apparatus which includes a final cleanup stage including an air blast and vacuum action. As shown at least one reciprocating brush that extends transversely to the pan and reciprocates back and forth is used to insure a vigorous scrubbing actionof the brush bristles into areas where upright or generally upright walls join the bottom of the pan to loosen material.

In the form disclosed, the apparatus includes a conveyor belt driven at a selected speed and on which the pans are placed. The brush reciprocation is at a speed somewhat greater than the speed of the conveyor so that the brushing action occurs against the pan in both directions of reciprocation of the brushes. In the specific form shown, two counter-reciprocating brushes are utilized for more vigorous cleaning action than is possible with only a single brush, and the counter-reciprocation (with the brushes moved toward each other and then away from each other in a cycle) provides offsetting forces when both brushes are engaging the pan so that higher scrubbing or brushing force can be utilized without causing the pan to slide on the conveyor. In addition, a conventional cylindrical brush is used for additional cleaning action. The vacuum hood is in place at the end of the unit to remove loosened crumbs, seeds, and other debris from the pan after the brushing has been completed.

The airflow stream of air blast is provided along the leading edge of the vacuum hood to held raise heavier seeds and the like from the pan so that they will be caught in the draft of the vacuum hood and carried into a suitable filter and air discharge chamber.

The vacuum hood can be made "floating" to permit it to raise and lower to accommodate pans of different heights.

DESCRIPTION OF THE PREFERRED EMBODIMENTS

Figure 1:
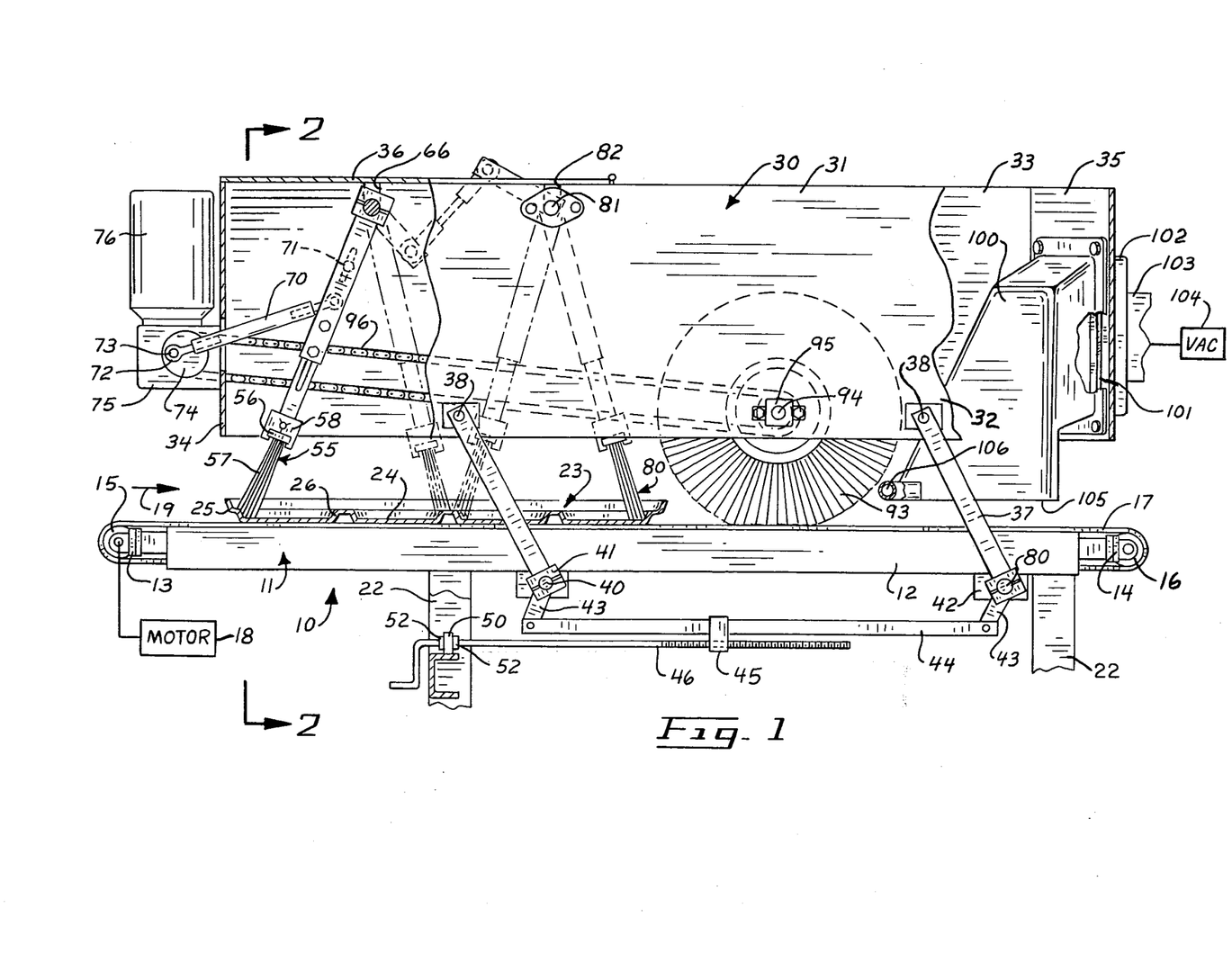
FIG. 1 is a side elevational view of a pan cleaning apparatus made according to the present invention with parts in section and parts broken away.

The pan cleaning machine illustrated generally at 10 comprises a conveyor assembly 11 that as shown has a frame member 12 extending longitudinally, and bearings 13 and 14 at opposite ends thereof that mount suitable conveyor rollers 15 and 16, respectively. An endless conveyor belt 17 is mounted over these rollers, and a motor shown schematically at 18 is used for powering the belt to move in direction as indicated by the arrow 19.

The frame 12 is supported on suitable legs or other supports indicated at 22, in space locations to support it adequately with respect to a supporting surface.

The belt 17 is made so that it will carry a plurality of bun pans 23. The bun pans have bottom walls 24, peripheral walls 25, and individual divider walls shown generally at 26, which separate the pan into individual compartments for making rolls or buns in a bakery. These pans are usually metal, and the compartment walls or divider walls 26 have generally uprightly extending surfaces as do the peripheral walls 25.

A cleaning assembly illustrated generally at 30 includes a housing 31 that has longitudinal side walls 32 and 33, respectively, a first end wall 34, and a second end wall 35. These walls form a generally rectangular enclosure except that the end wall 35 is formed with two sections at an angle to each other. The enclosure can have a top wall and a cover indicated at 36 that is hinged so that the cover can be lifted to uncover the interior of the housing at one end. The housing defined by the side walls 32 and 33, and the end walls has an open bottom, which is directly above and aligned with the conveyor belt 17.

As can be seen, the housing 31 is supported with respect to the conveyor frame through four links 37 (two on each side) which form a parallel linkage for raising and lowering the housing. The links 37 are pivotally mounted as at 38 to suitable support pads on the side walls 32 and 33, and second ends of the links 37 are drivably mounted onto cross shafts 40 through suitable clamp members 41. The cross shafts 40 in turn are mounted onto the bearings 42 that are attached to the frame 12, and each of the shafts 40 has an actuator arm 43 drivably attached thereto between the respective bearings 42. The arms 43 also are parallel to each other and extend downwardly, as can be seen in FIG. 1, and are pivotally mounted at their lower ends to a link member 44. The link member 44 carries a threaded bracket 45 that is fixed to the link 44, and a long screw threaded crank 46 is threaded through the bracket 45 at the lower end thereof.

The end of crank 46, as shown, is rotatably mounted in an upright bracket 50 that in turn is fixed to a cross member 51 extending between the legs 22 of the conveyor frame. A separate thrust collar 52 is positioned on each side of the bracket 50, and the collars 52 are fixed to the crank 46 so that they rotate with the crank. The collars provide thrust bearing members as they rotate relative to the bracket 50. By turning the crank 46, and thus threadably moving the block 45 in longitudinal direction of the crank, the arms 43 will be made to rotate both of the shafts 40, and therby drive the links 37 to raise and lower the housing 31. The housing is shown near its "up" position, and by threading the crank in a suitable direction, the housing can be lowered so that it is closer to the belt 17.

Figure 5:
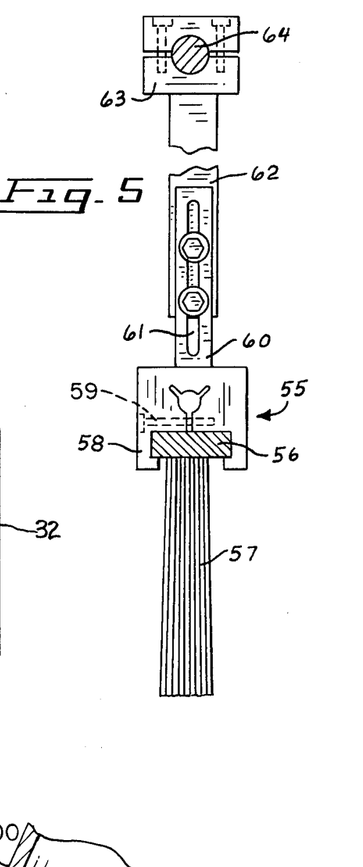
FIG. 5 is a vertical sectional view taken as on line 5—5 in FIG. 2.

A first reciprocating brush illustrated generally at 55 is mounted adjacent a first end of the machine, and as shown the brush comprises an elongated brush bar 56, with bristels 57 attached thereto. The brush bar 56 forms the back of the brush, and it extends transversely to the conveyor. The brush thus is a linear type brush. The brush bar or member 56 is clamped in suitable clamps 58 that are tightened onto the brush bar with cap screws 59 (see FIG. 5). Clamps 58 are attached in turn to straps 60 that have longitudinal slots 61 therein. The straps 60 in turn are bolted with a pair of bolts to second straps 62 that in turn are attached to brackets 63. The brackets 63 are clamped onto a cross shaft 64 for the first brush. The cross shaft 64 in turn is mounted onto suitable bearings 65 which are attached to the side walls 32 and 33. It should be noted that the side walls 32 and 33 have slots 66 opening to the upper edge of the side walls and into which the shaft 64 can be dropped or from which it can be removed for ease of changing of the brush and shaft assembly.

In addition, the shaft 64 has a downwardly depending actuator arm or lever 57 fixedly attached thereto with a suitable clamp, and the arm 67 is used as a driver for rotating the shaft 64 in a reciprocating fashion. A connecting rod 70, which is a link having rod end bearings at opposite ends thereof is mounted at one end in one of a plurality of holes indicated at 71 in the arm 67 through a suitable bearing arrangement on the rod end. Generally these rod ends are spherical seat bushings having a part spherical center member that can be bolted to a member. The link can pivot and twist with respect to the bearing member.

The other end of the link 70 extends out through the end wall 34, and has a rod end member 72 that is drivably mounted onto a crank pin 73 fixed to a crank disc 74. The crank disc 74 is driven by an output shaft of a gear reducer box 75, and a motor 76 is used for driving the gear reducer box 75.

A second linear brush assembly indicated generally at 80 is substantially identical in construction with the first brush assembly just described, and thus has the same numbers applied thereto. A cross shaft 81 is used for brush assembly 80 and the shaft is mounted in a slot 82 in the housing side walls. The shaft 81 is spaced from the shaft 64 a desired amount. Shaft 81 does not have an arm 67 thereon, however.

Figure 2:
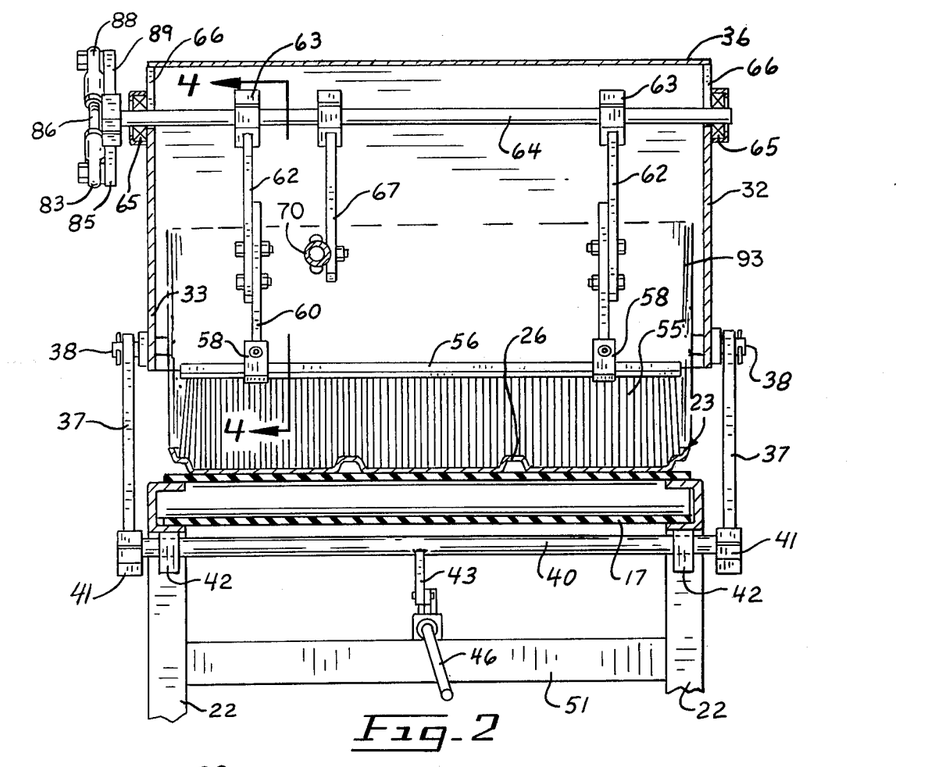
FIG. 2 is a vertical sectional view taken as on line 2—2 in FIG. 1.
Figure 3:
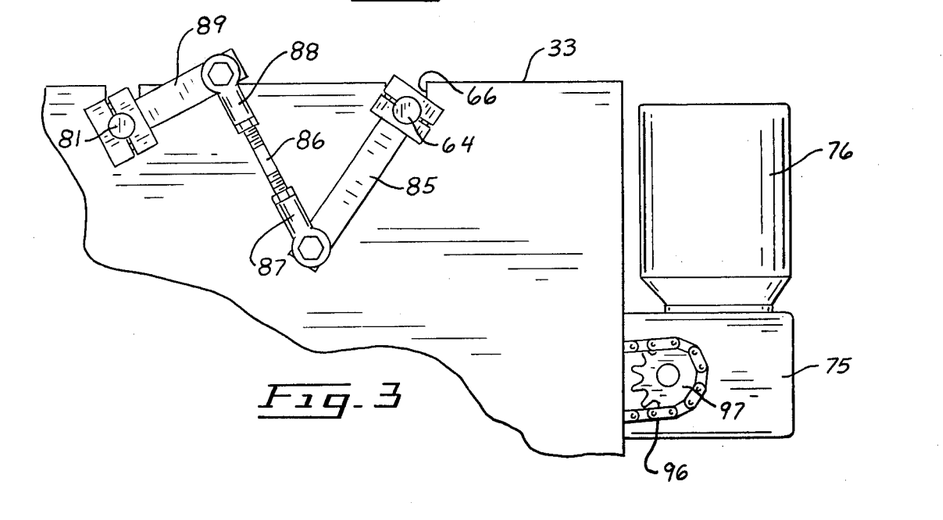
FIG. 3 is a side elevational view of an inner connecting link apparatus taken on opposite side of the unit from FIG. 1.
Figure 4:
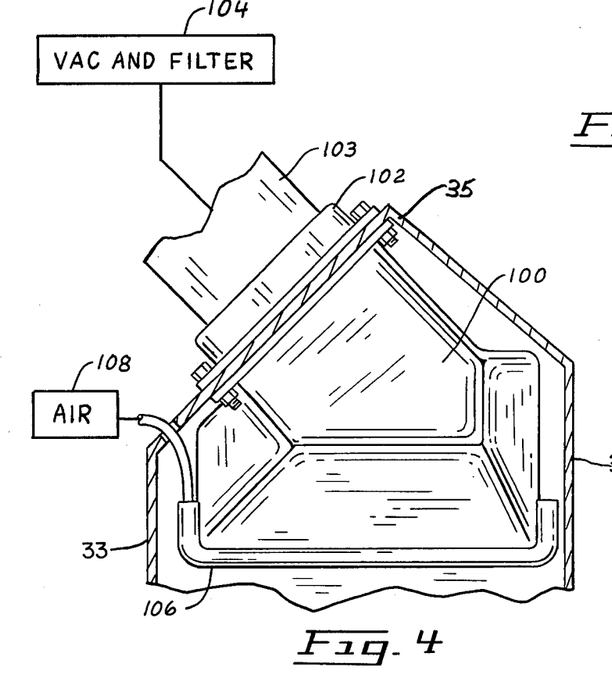
FIG. 4 is a top plan view of an end portion of the apparatus of FIG. 1 showing a vacuum hood installed in place.

Now referring to FIGS. 2 and 3, the drive between the shafts 64 and 81 is shown. The shafts rotate in opposition to one another, and thus the shaft 54 carries a fist lever arm 85, which is positioned on the outside of the side wall 33, and at the end of the arm a link 86 is mounted on a suitable rod end 87. The rod end is threaded onto the link 86 for adjustment purposes, and a second rod end 88 on the link 86 is attached to an outer end of a second lever 89 which in turn is drivably mounted onto the shaft 81.

Then when the crank disc 74 is rotating and the link 70 is driven, it can be seen that rotation of the shaft 64 will drive the lever 81 in a first direction, and link 86 will drive the lever 89 so that shaft 81 rotates in an opposite direction. Thus the brush assembly 80 and the brush assembly 55 will be at the opposite ends of their respective strokes as shown in FIG. 1, and upon further driving will reciprocate back toward each other to the position as shown in dotted lines where they are nearly touching each other approximately in a bisecting plane between the shafts 64 and 81.

By adjusting the length of the link 86, the relative positions of the brushes 55 and 80 can be adjusted to accommodate the desired movement. Further, moving the link 70 to a different hole 71 will provide for different length of movement of the bristles 57 of each of the brushes. Not only that, changing the lengths of the levers 85 and 89 will cause differential movement between the two brushes so that one of the brushes can move a greater distance than the other in its cycle if desired.

In addition, the housing 31 rotatably mounts a cylindrical brush illustrated generally at 93, and this brush is suitably mounted on a central shaft 94 which is rotatably mounted in suitable bearings 95 to the side walls 32 and 33. The cylindrical brush 93 is rotationally driven with a chain 96 that in turn is driven from a sprocket 97 mounted on the opposite end of the shaft of the gear box on which the disc 74 is mounted. The sprocket 97 and a portion of the chain 96 can be seen in FIG. 3.

At the remote end of the housing adjacent the cylindrical brush 93, a vacuum hood illustrated generally at 100 is mounted on the end wall 35 and this can be adjusted in up and down direction within suitable slots 101 which provide for adjustment of the hood to permit changing the vertical positioning of the hood with respect to the housing. The vacuum hood 100 has a plenum chamber 102 that is connected to a vacuum pipe or tube 103 that leads to a vacuum source or fan 104. The vacuum source also can have suitable filters on the output side to filter the material that is picked up by the vacuum hood and carried with the air from the vacuum fan.

Figure 6:
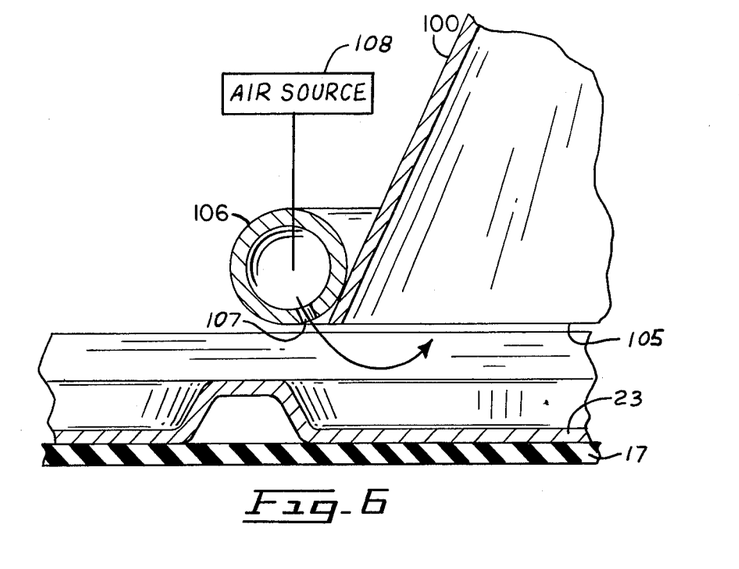
FIG. 6 is a vertical sectional view of the forward portion of the vacuum hood showing an air blast discharge pipe used in connection with the vacuum hood.
Figure 7:
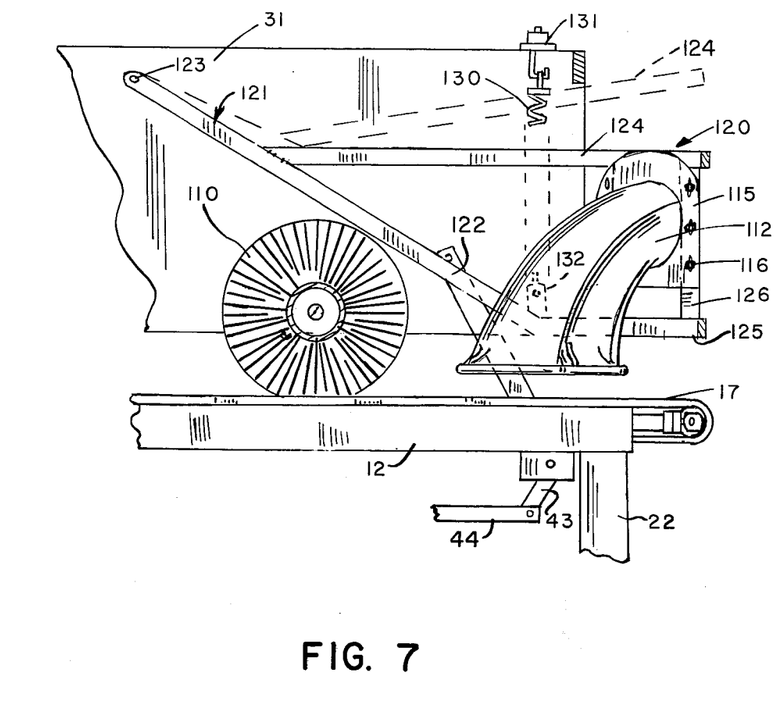
FIG. 7 is a vertical sectional view of a modified form of a mounting for the vacuum hood.
Figure 8:
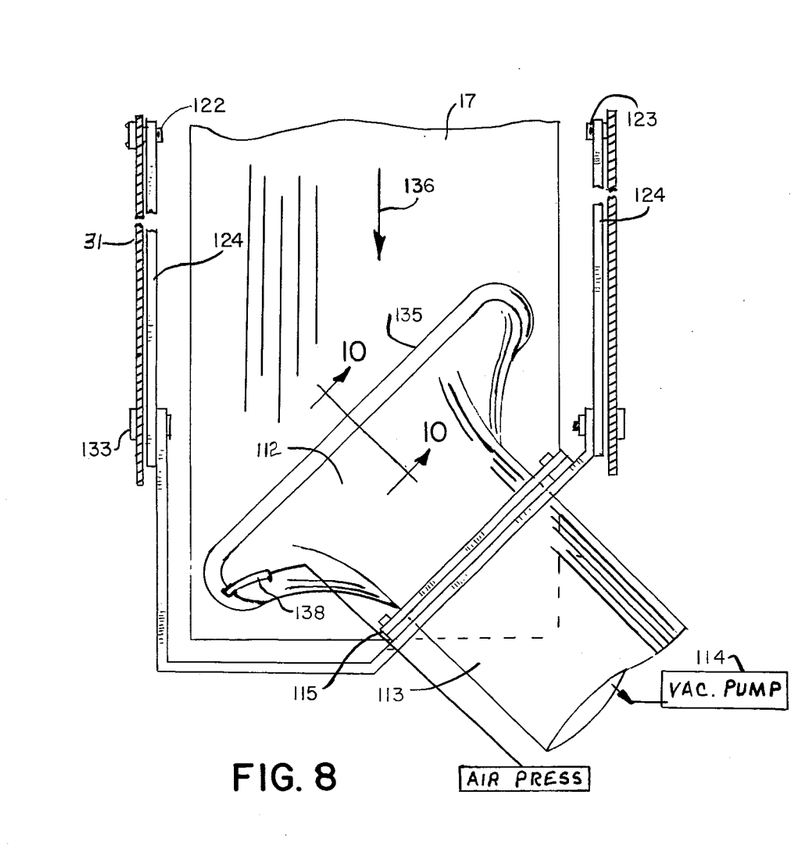
FIG. 8 is a top plan view of the device of FIG. 7.
Figure 9:
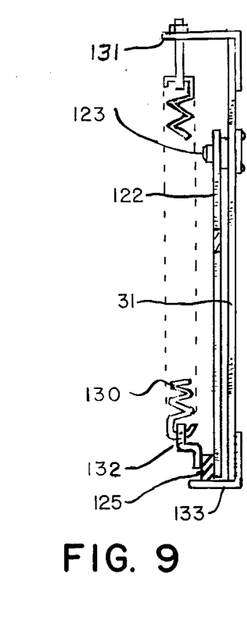
FIG. 9 is a fragmentary end view of the device of FIG. 7.

The vacuum hood has a lower peripheral edge indicated generally at 105, and at the end of the hood adjacent to the brush 93, a tube 106 is provided. The tube 106, as shown in FIG. 6 is hollow and has a plurality of apertures 107 spaced along the length thereof. The axes of the holes or apertures 107 are inclined as shown with respect to the conveyor belt so that when the interior of the tube is carrying air under relatively low pressure from an air source 108, the airflow out of the apertures will be directed down against a bottom of a pan indicated at 23 in FIG. 6, and will tend to blow seed, crumbs, or other material in the pan back up toward the interior of the vacuum hood 100.

The vacuum hood may be an ordinary hood commonly used with vacuums and extends across the width of the conveyor belt 17, so that as a bun pan passes under the edge 105 of the hood material in the pan will be sucked up into the hood from the pan.

When the unit is running, and the motor 18 is energized the conveyor belt 17 will be moving in direction as indicated by the arrow 19, and the pans 23 will be placed on the belt in sequence. The pans will first encounter the reciprocating brush or brushes, which will brush back and forth, and as shown in FIG. 1 will get into the corner areas between the upright walls and the base 24 of the pans to provide a good scrubbing action. The reciprocating brushes, when they move toward or away from each other tend to counteract the force from the other brush when they are both in the pan, and in this way do not tend to "scoot the pan" along the belt quite so much as when only one brush is used. Therefore more pressure can be used on the brushes when two linear brushes are working. However, even with ony one linear cross brush, it can be seen that the edges or corners of the pan are more adequately engaged by the angular positioning of the brush bristles as shown in FIG. 1 at the ends of its stroke, and the linear scrubbing action as the brush reciprocates back and forth.

The cylindrical brush 93 then finishes up the job by scrubbing the pan and the material is removed by the vacuum hood including the air blast from the tube 106 and openings 107. The end result is a clean pan that can be used again by the baker which does not have residues from previous baking in the pan.

Referring to FIGS. 7 through 10, a modified form of the invention is illustrated. The difference between the second form of the invention and the first form is that the vacuum hood at the output end of the pan cleaning device is mounted for vertical movement in up and down direction, so that it can be permitted to raise to clear obstacles, for example, where two pans might be nested one on top of the other and pass underneath the vacuum hood. The vacuum hood also is contemplated to be used without any brushing action, although brushes as shown can also be used to loosen foreign material. The reciprocating brushes would remain in position, and the new mounting for the vacuum hood placed in position at the end of the housing 31.

As shown, the frame 12 can be supported as before on legs or supports 22, and an endless conveyor belt 17 that is mounted as perviously explained will be used for carrying pans along which are to be cleaned. The housing 31 is the same construction as in the previous form of the invention and can be raised and lowered through the operation of linkage indicated at 44 and 43, operating on support arms which in turn support the housing. A brush 110 can be mounted to the housing 31, and as shown, this brush is a rotary cylindrical brush for loosening material in pans that are carried on the conveyor belt 17. The brush 110 will be driven in a suitable manner as previously explained, and may be of smaller diameter than the brush 93 in that the housing 31 can be positioned closer to this conveyor belt when the arrangement of the present invention is being used. A vacuum hood indicated generally at 112 can be of any desired configuration, and it has a slightly different outer configuration than that shown in FIGS. 1 through 6. In this form of the invention the hood is transversely elongated as perhaps can be seen in FIG. 8, and tapers into a cylindrical tube or member 113, the interior of which is connected to a vacuum pump 114 for supplying the necessary vacuum to the hood. The interior of the hood defines a chamber. The hood has a mounting flange 115 around the tubular portion thereof, and this flange 115 is mounted with suitable bolts 116 to a pivoting frame indicated generally at 120. The frame 120 includes spaced apart side frame members 121, each of which includes a main pivoting leg 122 that is pivotally mounted as at 123 to a suitable pin, mounted on the respective side wall of the housing 31. In addition, a top frame member 124 is connected to the pivoting leg 122, and a lower frame member 125 is also connected thereto. The upper and lower frame members are spaced apart, and are connected by upright members 126, to which the flange 115 is bolted.

As shown, the members 124 and 125 are spaced apart a distance greater than the flange, so that the vacuum hood can be adjusted in vertical direction if desired along the vertical members 126.

The weight of the frame assembly 121 is partially carried or supported by a pair of tension springs 130, one on each side of the unit. First ends of the springs 130 are attached through adjustable bolts to separate brackets 131 mounted on tops of the side walls of the housing 31, and the second ends of the springs 130 are connected to suitable brackets 132 mounted at the lower frame member 125. As shown perhaps best in FIG. 9, a stop bracket 133 is provided along each of the side walls of the housing 31, and the stop brackets are positioned to stop downward movement of the respective members 125 to positively position the vacuum hood in its lowermost point of travel. These stop members may be adjustable if desired. The strings 130 are such that they will carry part of the weight of the vacuum hood, particularly when it is adjacent to the stop 133. As shown in dotted lines in FIG. 7, the vacuum hood can pivot upwardly to accommodate additional pans that are stacked more than one high on the conveyor belt 17, if this occurs and the spring aids in supporting the weight of the vacuum hood.

Figure 10:
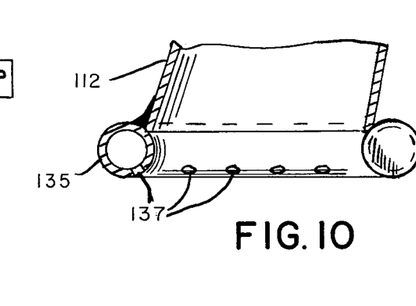
FIG. 10 is a view taken as on line 10—10 in FIG. 8.

In the first form of the invention, and also in the second form of the invention the vacuum hood is provided with a tube carrying air under relatively low pressure, so that there is a combined flow of air under pressure downwardly onto the pans passing underneath the vacuum hood, as well as a flow of air out through the vacuum hood. As shown in FIG. 10, the vacuum hood 112 has a tube 135 mounted adjacent the lower edge thereof, and this tube 135 extends across the leading edge, that is the edge that faces the pans as they are moved in direction toward the hood as indicated by the arrow 136. Tube 135 wraps around the ends of the hood, and can determine at the rear side at any desired location, as long as a sufficient amount of air under pressure provided from the tube contacts the pans as they pass underneath.

The tube 135 has apertures 137 wherein which provide a flow of air under pressure from the interior of the tube, and this tube is connected through a suitable hose or other connection 138 to a source of air under pressure. The air pressure is relatively low, being in the range of 2½ to 5 psi gage, but does provide an adequate flow out through the openings 137 to blow into pans passing underneath the vacuum hood and blow loose seeds, crumbs, and other foreign material into the air or to agitate such material. The flow of air coming underneath the edges of the vacuum hood caused by the vacuum pump will pick up such seeds and carry them outwardly.

The leading edge of the hood 112 is positioned obliquely with respect to the diection of pan movement. Thus, the entire leading edge of the pan is not subjected to vacuum at once. This prevents the vacuum from lifting the pan and causing a jam. The oblique position thus only subjects a portion of the pan to vacuum at a time and particularly avoids the sudden rush of air that might lift the leading edge of a pan.

The air pressure for agitation and impelling seeds and forcing material into the vacuum hood has been found to provide satisfactory cleaning of loose seeds and the like which may be accumulated in pans after baking, even though the pans may not have any baked on crust that needs to be removed. Thus, the air blast is effective in many instances without the use of brushing. The vacuum hood also may be operated in combination with brushes to insure removal of all loose foreign materials.

Many vacuum hoods that do not have the added air blast do not reliably pick up loose material, but when the airflow or air blast along the leading edge of the vacuum hood is provided, the loose material is agitated into the air so that it can be carried out through the vacuum hood.

The output side of the vacuum pump may be provided with large, low pressure drop filters to separate solids from the air before the air is discharged into the atmosphere.

What is claimed is:

1. A cleaning apparatus for flat pans having means forming a plurality of receptacles therein comprising a frame, conveyor means on said frame to support and move a pan to be cleaned generally in a plane along said frame from a first end of said frame to a second end of said frame, a vacuum hood mounted on said frame and positioned to overlie a pan moving along said first plane, said vacuum hood having peripheral edges defining a downwardly facing opening, said opening overlying an area of said conveyor means, means to support said vacuum hood relative to said frame comprising a pivoting subframe pivotally mounted with respect to said frame to permit said vacuum hood to more upwardly relative to said conveyor means as said subframe pivots without substantially changing the orientation of said opening relative to the conveyor means during normal operation, a source of vacuum connected to said vacuum hood to subject a pan to a vacuum induced airflow across the entire opening of said hood as a pan is moved below said opening, air tube means to carry air under pressure from a source, means to mount said air tube means adjacent a leading edge of said opening first overlying a pan being moved by said conveyor means, an air source connected to said air tube means, said air tube means including passageways defined therethrough having axes positioned at an angle with respect to said plane to direct streams of air under pressure in a direction downwardly toward a pan supported on said conveyor means and below said opening whereby material agitated by said stream of air will be subjected to said vacuum induced airflow from said vacuum hood, and stop means to stop downward movement of said subframe when the vacuum hood is in a desired stopped position relative to said plane.

2. The combination of claim 1 and spring means to counterbalance the weight of said vacuum hood to permit said hood to be lifted when a pan carried by said conveyor means engages the vacuum hood.

3. The combination of claim 1 wherein said air tube means extends along three edges of said opening, said passageways directing airflow toward the area below said opening from said three edges.

4. The combination of claim 1 wherein the leading edge of said opening extends obliquely to the direction of movement of a pan on said conveyor means.

* * * * *

UNITED STATES PATENT AND TRADEMARK OFFICE
CERTIFICATE OF CORRECTION

PATENT NO. : 4,044,420

DATED : August 30, 1977

INVENTOR(S) : Douglas R. Hanson

It is certified that error appears in the above-identified patent and that said Letters Patent are hereby corrected as shown below:

Column 1, line 34, "actionof" should be --action of--; Column 1, line 57, "held" should be --help--. Column 2, line 33, "space" should be --spaced--. Column 3, line 15, "therby" should be --thereby--. Column 5, line 43, "perviously" should be --previously--. Column 6, line 47, "determine" should be --terminate--; Column 6, line 51, "wherein" should be --therein--.

Signed and Sealed this

Thirteenth Day of December 1977

[SEAL]

Attest:

RUTH C. MASON
Attesting Officer

LUTRELLE F. PARKER
Acting Commissioner of Patents and Trademarks